Nov. 4, 1924.  
J. E. McCRAY  
1,513,839  
SELF LOADING AND DUMPING VEHICLE  
Filed Nov. 2, 1923  
2 Sheets-Sheet 1

INVENTOR.  
JOHN E. McCRAY.

BY  
ATTORNEYS.

Nov. 4, 1924.                                                                                        1,513,839
J. E. McCRAY
SELF LOADING AND DUMPING VEHICLE
Filed Nov. 2, 1923                         2 Sheets-Sheet 2
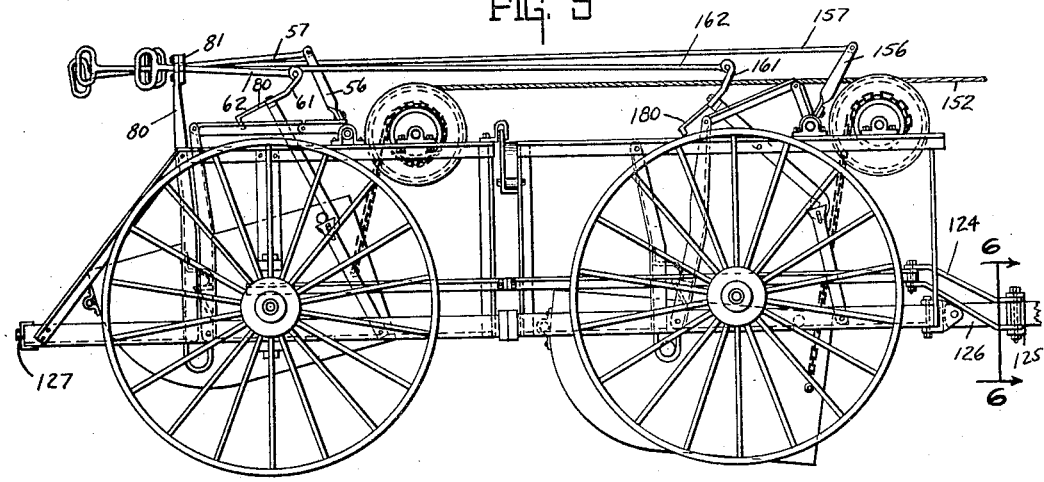
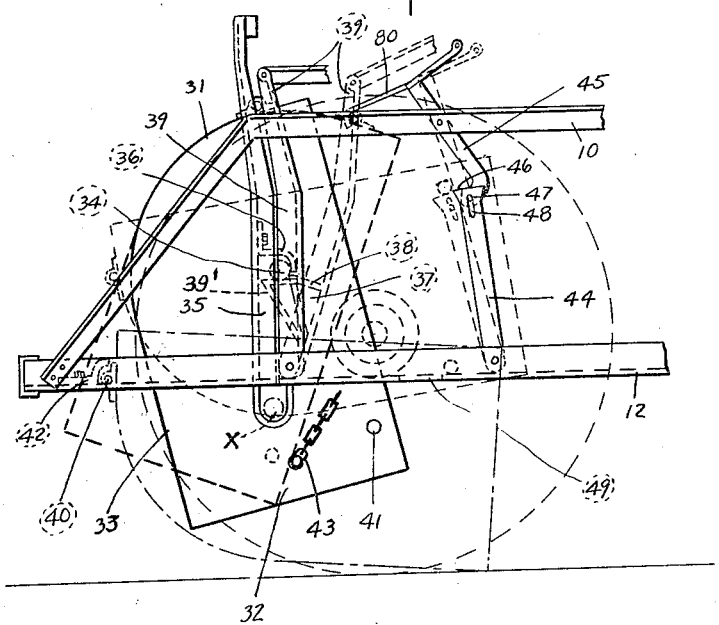
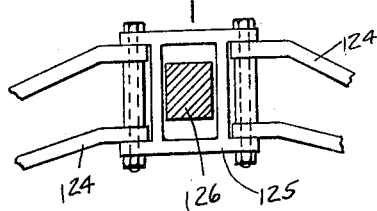
INVENTOR.
JOHN E. McCRAY.
BY
ATTORNEYS.

Patented Nov. 4, 1924.

1,513,839

UNITED STATES PATENT OFFICE.

JOHN E. McCRAY, OF INDIANAPOLIS, INDIANA.

SELF LOADING AND DUMPING VEHICLE.

Application filed November 2, 1923. Serial No. 672,326.

*To all whom it may concern:*

Be it known that I, JOHN E. McCRAY, a citizen of the United States, and a resident of Indianapolis, county of Marion, and State of Indiana, have invented a certain new and useful Self Loading and Dumping Vehicle; and I do hereby declare that the following is a full, clear, and exact description thereof, reference being had to the accompanying drawings, in which like numerals refer to like parts.

This invention relates to excavating scoops or haulers of the semi-automatic type.

The chief object of the invention is to construct a scoop or hauler and support the same upon a vehicular framework whereby the loaded scoop or bucket can be raised by the tractive force into load-carrying position, then released for automatic movement into dumping position but retained in carrying position and thereafter released for automatic movement into loading position.

Another main object of the invention is to construct the vehicular framework of the articulated type whereby each unit thereof may have universal movement relative to another unit.

One feature of the device consists in the construction of vehicular framework so that each unit includes a pair of wheels, all of said wheels being connected for turning and tracking movement whereby the device can be operated in close quarters.

Another feature of the device consists in the pivotal connection of the frame units for tilting movement about a horizontal axis.

A third feature of the invention consists in so arranging the controls for each unit and the several units that they can be controlled from one station such as the driver's seat.

Other features of the invention consists in the association of the several parts whereby the scoop may be positioned, released and maintained in the positions of loading, carrying, dumping and returning.

Still a further feature of the invention consists in the simplicity of construction of the device, the same being construed chiefly of standard angle, strap and sheet iron.

The full nature of this invention will be understood from the accompanying drawings and the following description and claims.

Figure 1:
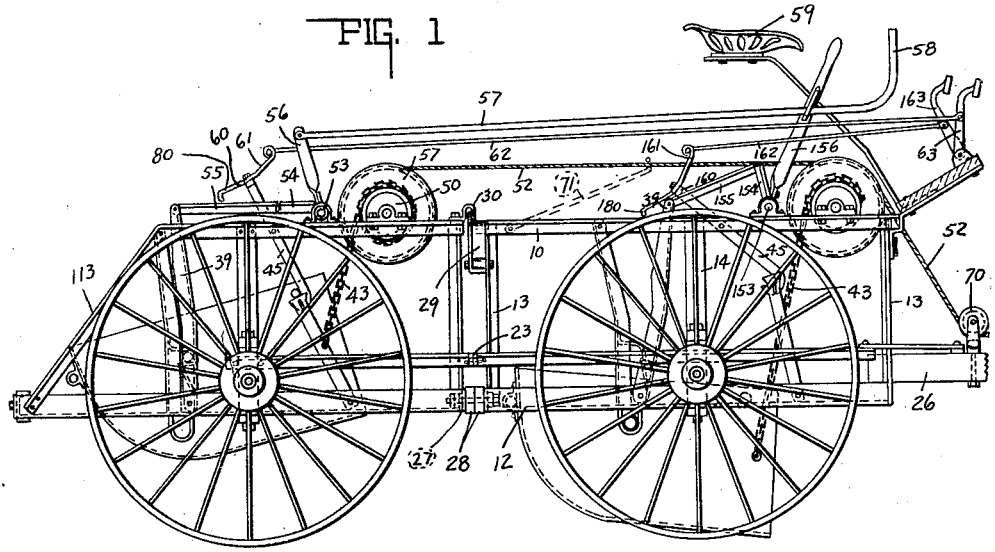
Figure 2:
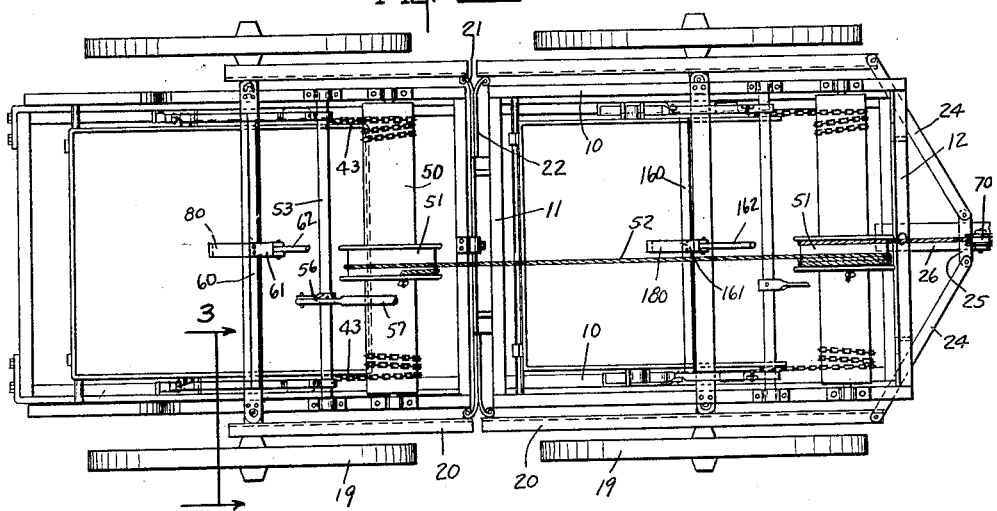
Figure 3:
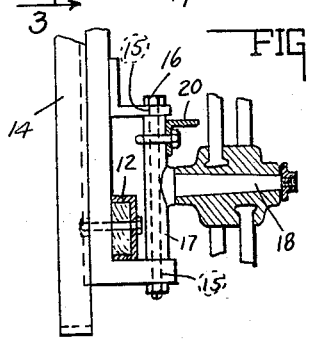

In the drawings, Fig. 1 is a side elevational view of the invention. Fig. 2 is a top plan view thereof with the seat removed. Fig. 3 is an enlarged partial section and partial elevation of the frames and wheels connection. Fig. 4 is an elevational view of the scoop and a portion of the supporting parts, the full lines indicating the dumping position, the dash lines indicating the load-carrying position and returning position, the dotted and dash lines indicating the loading position. Fig. 5 is a side elevational view of the vehicle embodying the invention arranged as a trailer for tractor service. Fig. 6 is a sectional view taken on line 6—6 of Fig. 5 and in the direction of the arrows.

In the drawings there is illustrated an excavating scoop or hauler vehicle of the semi-automatic type. In excavating work heretofore it has been the general practice to use slips or scoops for short-haul work. For longer haul work, it has been customary to use two wheel haulers or scoops, the capacity of which is considerably greater than that the slip type first mentioned. Where the excavation is at some distance from the dump, it has been the general practice heretofore to use dumping vehicles of the box or bottom dumping type, which vehicles are loaded by hand or by steam shovel. The usual practice is to use two teams to each dump vehicle, for drawing the same from the excavation. After reaching the level, the fore team is detached from the tongue of the loaded vehicle and the rear team hauls the same to the dump. The present invention seeks to utilize the advantages of the two wheel scoop and of the dumping vehicles without the disadvantages of each, such as lack of capacity in the first instance; and the requirement of other machinery, such as excavators, in the second instance other than two teams or a single tractor having a power pulley, and in certain instances the additional use of a plow where required. The total capacity of the two scoops herein shown approximately exceeds that of a cubic yard.

In Figs. 1 and 2 there is illustrated one form of the invention adapted to be used with teams; and in Fig. 5 there is another form of the invention adapted to be used with a tractor having a power pulley or with two tractors. In the first instance the driver of the vehicle operates the various levers when in the excavation and when on the dump; as well as driving the team for hauling the vehicle from the excavation to the dump. In the second instance the device is incorporated in a vehicle of the trailer type provided with suitable controls, which controls are operable in the excavation by the foreman therein, the power being supplied to the vehicle by the tractor controlled by the driver thereof. After a suitable number of trailers have been loaded and hauled from the excavation by the tractor, the same are connected together in the usual manner and the tractor thereupon hauls the loaded trailers to the dump. Here the foreman of the dump, who may be spreading during the interval when the vehicle is not at the dump, operates the same controls previously operated by the excavation foreman. This results in the dumping of the scoops and the tractor thereupon returns to the excavation with the desired number of emptied trailers, whereupon the operation is repeated. In the latter case, there is required but one tractor operator for each tractor, one dump foreman and one excavation foreman. Each tractor, it has been experimentally found, can economically handle from two to six or more trailers. In the first instance or team-hauling type, the dump foreman may be dispensed with and the driver may select the proper dumping position. Likewise the excavation foreman may be omitted or may be the driver of the lead team. Thus one lead team is adapted to serve any reasonable number of hauling teams and excavating vehicles hauled thereby. In certain types of excavation, grading and filling work, where teams and labor are relatively cheap, this type of construction is preferable and more economical to use. Where the foregoing favorable conditions are not to be found, the trailer type of vehicle is preferable and more economical to use. Furthermore, it has been found that one tractor, such as a Fordson, can economically handle four trailers. Since the cost of the trailer and the team type vehicle is substantially the same, the advantage rests with the trailer type, since the initial cost of one tractor of the beforementioned type is less than the present market value of the requisite number of teams. Furthermore, it has been experimentally found that the cost of operation including depreciation, repairs, interest, fuel and lubricant consumption, as well as driver's wages is less for the tractor than the equivalent number of teams and drivers therefor, except in the cases previously mentioned where certain advantageous conditions are to be found.

In the drawings 10 indicates a pair of parallel spaced top frame members connected by the transverse frame members 11; a pair of bottom angle irons 12 are parallel with the members 10 and are similarly connected by transverse members, and the two rectangular upper and lower frames are connected by the vertical members 13 to form a rectangular skeleton framework. Intermediate the same is supported a pair of oppositely positioned vertical frame members 14. In Fig. 1 it is noted that the vehicle framework is extended toward the lower rear end and the beforementioned description does not apply, for the connections 113 are inclined instead of vertical as members 13. Thus, two independent rectangular frameworks are provided. Each rectangular framework adjacent the vertical support 14 supports a bearing construction including the aligned bearings 15 adapted to receive the king pin 16 of a spindle bearing 17 supporting the spindle 18, which in turn supports the wheel 19 suitably secured to said spindle. Each of the spindle bearings 17 supports a strap member 20. These strap members are positioned between the rectangular frameworks previously described and the wheels 19. In one instance the strap members 20 extend both forwardly and rearwardly of the spindle; while in the other instance they extend forwardly only, this being in the rear scoop unit. The forward portions of the steering or turning frame members 20 of the rear unit are connected together by a transverse strap 21. The rear ends of the rear extensions of the turning or steering frame members 20 of the front unit are connected together at the rear end of said unit by a transverse substantially similar strap 22. As shown clearly in Figs. 1 and 2, and particularly Fig. 2, these straps are connected together centrally as at 23. The forward ends of the forward extensions of the front unit, steering or turning frame members 20 are connected to the rods 24. These rods in turn are connected to a support 25 carried by the tongue 26 of the vehicle. When the tongue 26 is turned, the rods 24 turn the wheels of the front unit in the same direction through the turning frame members 20; and since the turning frames are connected together at 23, the wheels of the rear unit are simultaneously turned in the opposite direction and to the same degree as the wheels of the front unit. Thus the front and rear wheels track and a short turn can be made. This permits the vehicle construction to be operated in relatively close quarters.

In view of the nature of the work to be performed by the vehicle and the inequalities of the earth surface operated upon and traversed, a tilting connection is provided between the supporting frameworks of the front and rear units. Herein such a connection includes the centrally positioned pin or king bolt 27 connecting the two adjacent lower members 28 of the front and rear supporting frameworks. The upper ends or adjacent members 11 are slidably connected together by an arcuate construction concentric with the pivot pin 27. Herein the same constitutes an arcuately shaped angle iron 29 suitably secured to the upper rear portion of the front unit framework. Cooperating therewith is a U-shaped groove forming strap 30 for receiving one side of the arcuate angle iron 29. The groove construction 30 is suitably secured to the upper forward portion of the rear unit framework and medianly thereof. The tongue and groove connection thus described is concentric with the pivot connection 28 previously described. Thus the rear and front units may have independent tilting movement with respect to each other and yet tractive effort exerted upon the front unit will be transmitted to the rear unit.

Since each of the units are substantially similar and the operation is substantially similar, except as previously described and as hereinafter to be set forth specifically, a description of the construction common to both units will suffice for an understanding of them both. Reference, therefore, may be had particularly to Fig. 4, wherein there is illustrated a scoop having a curved back 31, a pair of flat sides 32 and a flat bottom 33, the front and top being open. Herein each scoop is shown provided with a laterally extending pivot pin 34 so positioned with respect to the body that the center of gravity of the scoop when unloaded lies toward the curved back 31 when said scoop is in the dumping position shown by the full lines in Fig. 4. When loaded, however, it has been found that the front end of the scoop is about one hundred and forty pounds heavier than the rear end of the scoop. From the foregoing it will be readily apparent that if the scoop is locked in an elevated carrying position, the weight of the earth thereon will automatically tilt the released scoop into the dumping position; and after the earth has been dumped therefrom, the weight of the scoop will automatically tilt the scoop into a neutral position substantially coinciding with that previously occupied by the scoop when loaded, although not necessarily restricted thereto, as will be more fully explained hereinafter.

The pivot 34 upon each side 32 of the scoop is supported upon what may be termed a moving pivot or plural pivot bearings. Herein such construction includes a U-shaped channel 35, the upper end of which is partially closed by the strap 36, and adjacent said strap forming a part of said U-shaped channel, is a pivotal closure 37 carrying a ledge 38 and an inclined face 39'. The member 37 is extended upwardly, as at 39, and said extension is rocked by means hereinafter to be described. It will be apparent, therefore, that when the member 37 is tilted forwardly to remove the supporting ledge 38 from beneath the pivot restrained upon said ledge by the overhanging catch portion 36 previously described, the pivot drops into the U-shaped slot or bearing 35 into its lowest possible position indicated by X. When in this position, the scoop is positioned as shown by the dotted and dash lines in Fig. 4. This is secured through the following means. Upon the back of the scoop there is positioned suitable means, and herein the same is shown in the form of a transverse rod 40. This rod 40 engages the horizontal ledge of the transverse member 12 and prevents further downward movement of the rear end of the scoop. Upon each of the sides 32 and near the upper forward end thereof and projecting laterally therefrom is a stop pin 41. The stop pin 41 when the ledge 38 is retracted from beneath the pivot pin 34, also engages upon the ledge of the angle iron 12 forming part of the supporting framework; and forward movement of the rectangular framework constituting the unit will cause the scoop to be loaded. Herein a suitable stop 42 is illustrated for preventing upward tilting movement of the forward edge of the scoop when loading.

When the scoop has been loaded by the forward movement of the vehicle, suitable means, such as the chains 43, are actuated to elevate the scoop. It is to be noted that the vehicle may remain stationary while the scoop is elevated into the load carrying position, and thus a straight lift is secured which permits the scoop to be completely filled, since heretofore in some devices utilizing elevating scoops the latter have been elevated only during the forward movement of the vehicle supporting the same.

Hoisting the chains 43 positioned at each side of the scoop and secured thereto near the center of the side 32 and near the forward edge thereof, causes said scoop to be elevated not only at its front end but also causes the pivot pins 34 to ride upwardly in the slots 35; and if the lever 39 is not in the open position shown by the dotted lines in Fig. 4, said pivot pin cams the same into said dotted line position. This upward movement of the pivot pin is restrained by the catch 36; and after the pins have reached this position, the levers 39 are actuated to project the ledges 38 beneath said pivot pins and lock the scoop upon its elevated axis. Thereafter suitable means is associated with the scoop and herein the same is associated with the stop pins 41 for locking the loaded scoop in the load carrying position, thereby relieving the strains from the hoisting cables or chains 43. Herein such means includes similar constructions positioned upon opposite sides of the scoop and connected for simultaneous operation. A link 44 is pivotally supported at its lower end to the frame member 12 forwardly of the U-shaped pivot 35. Above this pivotal support and upon the upper member 10, there is pivotally supported a lever 45. The lower free end of the lever 45 is turned toward the scoop and forms a catch or supporting ledge 46. This end also carries a pin 47 which is slidably supported in an elongated slot 48 formed in the upper free end of the link 44. The dotted line position in Fig. 4 illustrates one off-center position, wherein the lateral portion 46 of the lever 45 is projected beneath the stop pin 41 and supports the forward end of the loaded scoop. The greater the pressure, by reason of the load, exerted by the pin 41 upon the lateral face 46, the greater will be the locking support, since in this dotted line position, see Fig. 4, the link 44 and lever 45 are off-center with respect to each other. The full line positions of said link and lever, see Fig. 4, illustrate the other off-center position which is the releasing position for the pin 41.

When the lever 45 is actuated to release the ledge 46 from beneath the stop pin 41, the scoop by reason of the difference in weight with respect to the rearward and forward portions thereof is tilted downwardly into the full line position from the dotted line position, see Fig. 4. In so doing, the pin 41 describes an arc and passes through a notch 49 formed in the frame member 12. Immediately upon the dumping of the load, as previously explained, the scoop automatically is tilted upwardly. In such tilting movement, the pin 41 retraces its arcuate path and again passes through the slot 49. The scoop then rides free and swingingly or may be latched in the load carrying position, as illustrated by the dotted lines in Fig. 4, although it is not necessary to latch the scoop in that position. Thereafter the lever 39 is actuated to drop the pivot pin 34 from its elevated position into its lowest position, which causes the scoop to fall into the loading position. When the scoop is to be latched in the tilted position, engagement with dumped material tilts the scoop rearwardly and simultaneously levels said material. This rearward tilting increases the clearance, see Fig. 4, and projects the rear end of the scoop forwardly over the center when it is latched by the strap hook 80 or 180.

Reference will now be had particularly to Figs. 1 and 2, wherein the means for actuating the lever 39, lever 45 and chain 43 are illustrated. In these particular figures each framework unit pivotally supports a roll shaft 50, and to said roll shafts 50 is secured one end of the chain 43. Positioned between the mountings for the chains 43 is a pulley 51, and secured to the pulley 51 or wrapped around the same is an actuating cable 52. Actuation of the cable 52, therefore, serves to coil and uncoil the chains 43 upon the shaft 51. Pivotally supported upon the upper part of the framework of each unit is a transverse rock shaft 53. Near each end of the rock shaft and rockable therewith is a lever 54, one end of which is secured to the shaft 53 and the other end of which is secured to a link 55 in turn connected to the upper end of the lever 39 associated with the pivot pin 34. A lever 56 is suitably secured to the shaft 53 and is adapted to rock said shaft by means of a link rod 57, terminating at a convenient portion of the vehicle, and herein it is shown terminating in the handle 58 adjacent the seat 59. Thus actuation of the handle 58 serves to rock the lever 39 upon its pivotal support on the frame member 12 to project and retract the ledge 38 into and out of the pivot forming position.

Herein the upper ends of the levers 45 are shown connected by a transverse rod 60, and intermediate the same and projecting therefrom is an extension 61 connected to a rod 62 associated with a foot lever 63 adjacent the seat 59. The operator, thus, by depressing the foot lever 63 tilts the lever 45 into the load sustaining position as shown by the dotted lines in Fig. 4 and by the full lines in the rear unit of Fig. 1. By retracting the foot lever 63, the levers 45 are simultaneously rocked into the full line position, as shown in Fig. 4.

Herein the upper end of the levers 39 of the forward unit are connected by links 155 to levers 154 carried by a rock shaft 153 and actuated by a lever 156, the foregoing construction being substantially a duplicate of the construction previously described for actuating the rear unit levers 39. Similarly the forward unit levers 45 are connected together at their upper free ends by a transverse member 60 carrying an intermediate extension 161 actuatable by a rod 162 operable through a foot lever 163.

Herein the tongue 26 is shown provided with a pulley 70, and this pulley 70 is associated with the cable 52. The cable 52 is herein shown wrapped several times around the forward pulley or drum 51, and thereafter passes rearwardly to the rear pulley or drum 51 and is secured thereto. The cable 52 constitutes the "in hauling line" and the movement thereof is approximately four feet. The lead team, therefore, moves four feet when unhooked from the tongue 26 and connected to the cable 52, the vehicle remaining stationary. This four foot movement of the cable 52 causes the forward unit pulley 51 to revolve, thereby coiling the chains 43 upon the drum shaft 50. This elevates the loading scoop; and, of course, elevates the rear scoop. After the forward scoop has been elevated and locked through the levers 45, the lead team is detached from the cable 52 and again connected to the tongue 26. The rear scoop if not restrained by the lever 45 drops into loading position when the pivot 34 is released from its upper pivotal support. Otherwise, the lever 45 must be actuated to release the stop pin 41. The downward movement of the scoop into the loading position serves to uncoil the chains 43 upon the rear unit drum 50 and thus to reversely wind the cable 52 upon the drums 51, thereby taking up the slack and returning the cable 52 for subsequent operation. After the scoop has been loaded, as previously described, the lead team is again detachable from the tongue 26 and connected to the cable 52. Subsequent forward movement of the cable 52 through the beforementioned distance elevates the rear scoop, whereupon it is locked in the load carrying position. This forward movement thus re-winds the forward chains 43 and the rearward chains 43 but extends the in-hauling cable four feet beyond the tongue. A suitable device, such as a rockable lever 71, is adapted to engage the cable 52 and when actuated by the driver after the rear scoop is loaded, said rocking movement takes up the slack in the cable 52 and thus prevents interference with the hauling team by the cable 52 which has been retracted.

In Fig. 5 a device substantially identical to that previously described is illustrated in detail. This device is adapted to be associated with a tractor having a power pulley, and herein the invention is illustrated as of the trailer type.

In this type of the invention the rear unit frame carries a pair of upstanding brackets 80, and supported thereby is a transverse support 81. Herein the rods 57, 62, 157 and 162 are extended rearwardly and are slidably supported by the transverse support 81 terminating in suitable handles for sliding said rods with respect to said support for actuating the respective levers 39 and 45 on the front and rear unit constructions. Herein, however, the following difference is to be noted; the tongue 126 is constructed so that it is suitable for connection to a tractor or to the rear of another trailer. The rear portion 127 of the vehicle is likewise constructed so as to permit the attachment of a following trailer. Since tractors are provided with a power pulley operable independently of the traction wheels, the cable 152 preferably is connected thereto and is actuated at the desired times by the operator of the tractor for hoisting the forward and rear scoops. A suitable takeup device may be provided, such as that illustrated at 71 in Figs. 1 and 2, but herein the same is not necessary. If desired, separate cables may be applied to the drums 51 upon the shaft 50 of each of the front and rear units.

As shown in Fig. 6, the tongue and slot arrangement permits of substantially universal movement of the tongue with respect to the supporting framework.

The invention claimed is:

1. A loading and dumping vehicle including a pair of scoops, a pair of wheels for each scoop, a spindle for each wheel, a framework pivotally supporting said spindles of each scoop, means connecting said frameworks together, and other means connecting said spindles together for simultaneous movement.

2. A loading and dumping vehicle including a pair of scoops, a pair of wheels for each scoop, a spindle for each wheel, a framework pivotally supporting said spindles of each scoop, means connecting said frameworks together, other means connecting the spindles of each scoop together for simultaneous movement, and hinge means connecting said spindle connecting means for securing the reverse simultaneous movement of the spindles of the other scoop.

3. A loading and dumping vehicle including a pair of scoops, a pair of wheels for each scoop, a spindle for each wheel, a framework pivotally supporting said spindles of each scoop, and means pivotally connecting said spindles together for simultaneous movement.

4. In a vehicle of the character described, the combination of a framework including a slotted laterally extending angle support, a scoop pivotally supported upon said framework, and a pin on said scoop passable entirely through the framework slot and free from the support to permit dumping of the scoop contents.

5. In a vehicle of the character described, the combination of a framework including a slotted laterally extending angle support, a scoop pivotally supported upon said framework, a pin on said scoop passable entirely through the framework slot and free from the support to permit dumping of the scoop contents, said pin being returnable through the framework slot and seatable upon said framework, and additional means upon said framework providing a pivotal support in a plurality of parallel positions.

6. In a vehicle of the character described, the combination of a supporting framework having an aperture therein, a pair of pivot forming supports positioned one above the other and above and below said apertured framework, a scoop pivotally supported in either of said pivot forming supports, a pin carried by said scoop and passable through the aperture of said support and oppositely positioned with respect to the scoop pivot.

7. In a vehicle of the character described, the combination of a supporting framework, a scoop including an eccentric pivot when unloaded and oppositely positioned when fully loaded for automatic dumping by tilting, and returning by tilting when unloaded.

8. In a vehicle of the character described, the combination of a supporting framework having an aperture therein, a pair of pivot forming supports positioned one above the other and above and below said apertured framework, a scoop pivotally supported in either of said pivot forming supports, a pin carried by said scoop and passable through the aperture of said support and oppositely positioned with respect to the scoop pivot, and means for retaining the scoop in loaded position.

9. In a vehicle of the character described, the combination of a supporting framework, a scoop including an eccentric pivot when unloaded and oppositely positioned when fully loaded for automatic dumping by tilting, and returning by tilting when unloaded, and means supporting the scoop pivot in a plurality of parallel positions.

10. In a vehicle of the character described, the combination of a supporting framework having an aperture therein, a pair of pivot forming supports positioned one above the other and above and below said apertured framework, a scoop pivotally supported in either of said pivot forming supports, a pin carried by said scoop and passable through the aperture of said support and oppositely positioned with respect to the scoop pivot, means for retaining the scoop in loaded position, and means supporting the scoop pivot in a plurality of parallel positions.

11. In a vehicle of the character described, the combination of a framework, a plurality of scoops movably supported thereby, a drum for each scoop supported by said framework, hoisting means connecting each scoop with its drum, a pulley upon each drum, a single cable associated with all of said pulleys for successive hoisting of each scoop, and a latch associated with each scoop for retaining the same in the hoisted position after hoisting.

In witness whereof, I have hereunto affixed my signature.

JOHN E. McCRAY.